United States Patent
Helfman et al.

(10) Patent No.: US 8,291,214 B2
(45) Date of Patent: Oct. 16, 2012

(54) APPARATUS AND METHOD FOR SECURE REMOTE PROCESSING

(75) Inventors: Nadav Helfman, Binyamina (IL); Rachel Ebner, Raanana (IL)

(73) Assignee: SAP Portals Israel Ltd, Raanana (IL)

( * ) Notice: Subject to any disclaimer, the term of this patent is extended or adjusted under 35 U.S.C. 154(b) by 298 days.

(21) Appl. No.: 12/650,564

(22) Filed: Dec. 31, 2009

(65) Prior Publication Data

US 2011/0162059 A1    Jun. 30, 2011

(51) Int. Cl.
*H04L 29/06* (2006.01)
(52) U.S. Cl. .................................................. 713/153
(58) Field of Classification Search ............... 726/5–7, 726/11, 12; 713/153
See application file for complete search history.

(56) References Cited

U.S. PATENT DOCUMENTS

| 6,591,265 B1* | 7/2003 | Erickson et al. ............. 1/1 |
| 2008/0046727 A1* | 2/2008 | Kanekar et al. ............. 713/168 |
| 2009/0241170 A1* | 9/2009 | Kumar et al. ............. 726/3 |

* cited by examiner

*Primary Examiner* — Edward Zee

(57) ABSTRACT

A method and apparatus for providing on-demand services to an organization. The services are provided by a hosting center. The apparatus comprises an on-premises connectivity agent at the organization, which receives requests or commands from computing platforms within the organization and concentrates all communication to and from the hosting center. The on-premises connectivity agent embeds or otherwise introduces organization metadata to the messages. The apparatus further comprises a hosted connectivity agent associated with the hosting center. The apparatus may further comprise a central connectivity component for routing communication between the on-premises connectivity agent and the hosted connectivity agent, in accordance with the metadata. Communication between the on-premises connectivity agent and the central connectivity component flows through a secure channel and comprises only communications related to the organization. Communication between the central connectivity component and the hosted connectivity agent may comprise communications related multiple organizations. Such communications may be multiplexed.

10 Claims, 2 Drawing Sheets

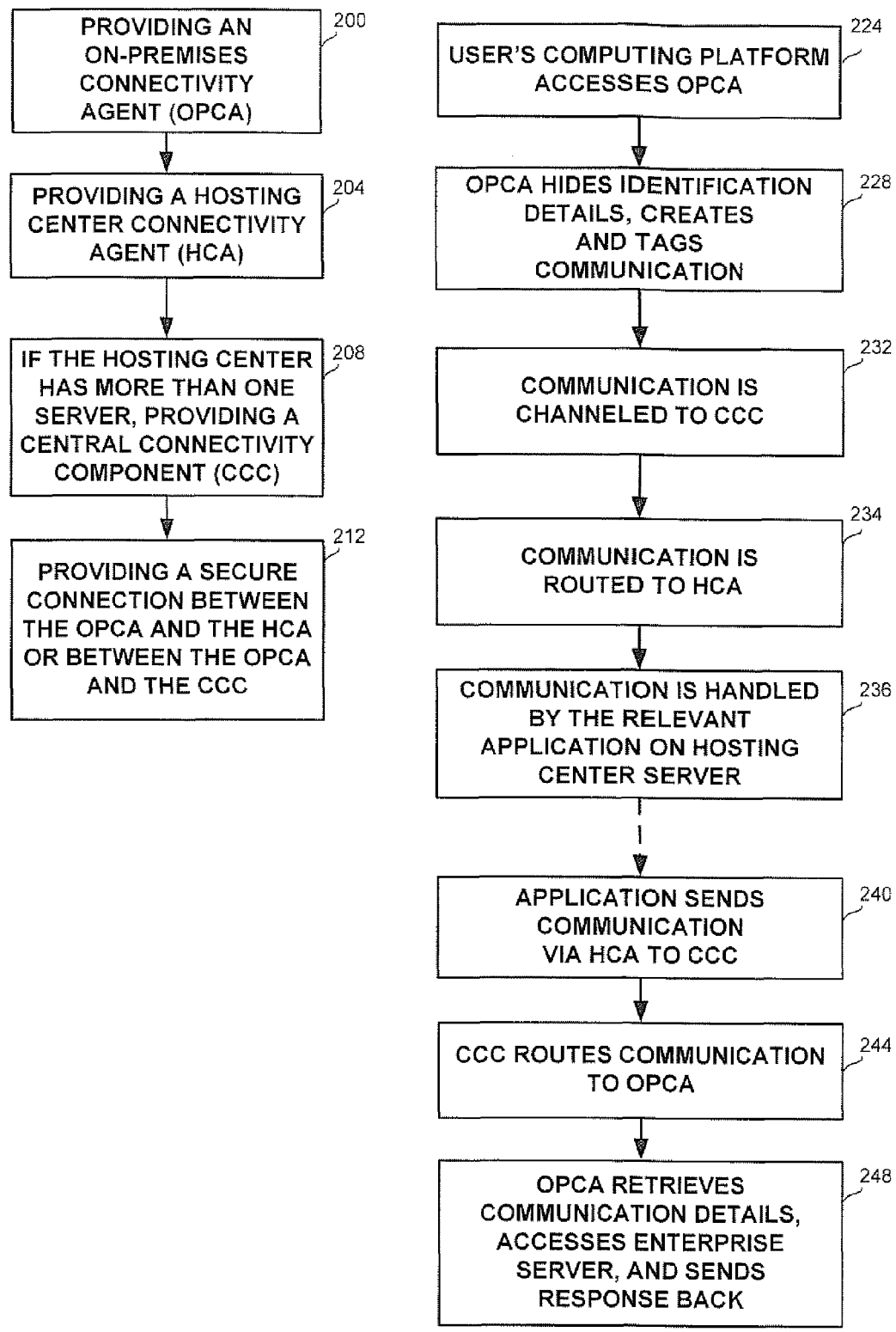

APPARATUS AND METHOD FOR SECURE REMOTE PROCESSING

TECHNICAL FIELD

The present disclosure relates to computer networks in general, and to an apparatus and method for remote processing, in particular.

BACKGROUND

Almost any organization today typically employs a computer network for carrying out everyday functions and tasks of the organization, such as administration, human resources management, development, production, marketing, sales, customer management, and many other functions.

Traditionally, organizations used to execute all their computerized operations and store all their data on premises, i.e., on one or more computerized platforms, possibly connected in a network.

As communication with external systems, such as accessing the internet became a necessity, firewalls were introduced for protecting the organizational network by preventing unauthorized access from outside the network, and allowing restricted and controlled access to parts of the network.

Later organizations started purchasing software solutions provided by servers which are hosted externally to the organizations, for example in hosting centers residing outside the organization Local Area Network (LAN). Such solutions are sometimes termed on-demand systems, since the organization can use them according to current needs and does not have to pre-purchase or otherwise commit to usage. On demand systems may provide computing services, as well as storage area for storing organization data. In many cases, such hosting centers are multi-tenant, i.e. provide software services for multiple customers on the same server.

An organization may have to enable the externally hosted software access to the organization data or on-premise systems, in order to allow the hosted software to provide the required functionality. However, such access introduces a number of security problems. First, the information stored within the organization and accessed by the hosted software may comprise the core business information of the organization, so that any access from the outside to on-premise systems is a potential security risk and need to be properly controlled with a security solution. Second, the hosted solution machines are external to the organization LAN and are not under its control. Further, the overall security level of the hosted servers is unknown.

Even further, as indicated above, the hosting servers may be multi-tenant, i.e. provide services or store data for multiple customers on the same physical systems. Therefore, since multiple customers have access to the same machine in order to run their software, then some access is known to be granted to people not trusted by the organization.

Yet another group of considerations relates to the cost of the solution, sometimes referred to as Total Cost of Ownership (TCO). Although receiving all services in-house by systems of the organization itself provides the highest security and most tailored solution, the solution price which is of essence and may be higher than the price of using on-demand services.

An external solution is thus required to be low cost for the customer organization, as well as to the provider of the solution or the hosted software. The relevant costs may include solution establishment costs, as well as ongoing costs, such as service, maintenance, updates or others.

Low cost for the customer means easy and as much as possible off-the-shelf installation and configuration, and as little as possible changes to the Information Technology (IT) landscape of the organization, including for example firewall configuration.

Low cost for the provider of the hosted software relates to easy and preferably automatic installation and configuration for any new customer and application.

Currently existing technologies include Virtual Private Network (VPN) solutions for connecting to an external server. However, such a solution is not suitable for multi-tenant environments since it is more open to attacks by different users using the same servers.

Another solution relates to integrating hosted and on-premise systems. This solution can work in two modes. In one mode, the integration server is on-premise while the data center that stores the organizational data is external and may be used by multiple customers. In the other mode, the data center, as well as the integration server are external to the organization. This solution also risks the on-premise systems of the customer due to the multi-tenancy of the hosted server.

Yet another solution relates to extranet or federation, i.e., enabling organizations to collaborate. Federation involves standards for data or resource sharing, authentication, user identity sharing, or the like. However, federation solutions are not cost-optimal and require significant resources from all collaborating parties.

There is thus a need in the art for a method and apparatus for providing software services to an organization by an external provider that connects to the organization's systems, without compromising the security of the organization data and operations, and while reducing costs both for the customer organization and to the service provider.

SUMMARY

One aspect of the disclosed subject matter relates to an apparatus for providing on-demand service to an organization by a hosting center, the apparatus comprising: a hosted connectivity agent component executed by a server associated with the hosting center, for providing the on-demand service; an on-premise connectivity agent located within a network associated with the organization for communicating with a server computing platform, the server computing platform associated with the organization network, and for delivering the on-demand service to the organization, the on-premise connectivity agent providing metadata to communications sent from the organization network to the hosted connectivity agent component; and a central connectivity component for routing a communication between the hosted connectivity agent component and the on-premise connectivity agent, wherein only communication that relates to the organization is exchanged between the central connectivity component and the on-premise connectivity agent, and such that communication between the central connectivity component and the on-premise connectivity agent is secure. Within the apparatus, multiple users within the organization may share an account of the organization with the hosting center, and wherein the metadata comprises indication to the account. Within the apparatus, the on-premise connectivity agent is protected by a firewall of the organization. Within the apparatus, the hosted connectivity agent is optionally protected by a firewall of the hosting center.

Another aspect of the disclosure relates to a method for providing an on-demand service to an organization by a hosting center, the method comprising: receiving a message sent from a computing platform of the organization to an on-premise connectivity agent; creating a communication in accordance with the message, the communication comprising metadata related to the organization; sending the communication to a central connectivity component via a secure link; routing the communication to a hosted connectivity agent associated with the hosting center using the metadata; and sending the communication to an application associated with the hosting center, wherein only communication related to the organization is exchanged between the central connectivity component and the on-premise connectivity went. Within the method, routing the communication to the hosted connectivity agent is optionally performed using a proprietary protocol. The method can further comprise: sending a second communication from the hosted connectivity agent to the central connectivity component; routing the second communication from the central connectivity component to the on-premise connectivity agent; and sending information from the communication to the computing platform. Within the method, the central connectivity component optionally isolates between a network associated with the organization and the hosting center. Within the method, communication between the on-premise connectivity agent and the central connectivity component optionally uses Hypertext Transfer Protocol.

Yet another aspect of the disclosure relates to a method for providing an on-demand service to an organization having an organization network by a hosting center, the method comprising: sending a communication associated with an application providing the on-demand service from a hosted connectivity agent within the hosting center to a central connectivity component, the communication comprising information related to the organization; routing the communication from the central connectivity component to an on-premise connectivity agent within the organization, using a secure link; and sending a message associated with the communication from the on-premise connectivity agent to a computing platform within the organization network. The method can further comprise: receiving a response from the computing platform; generating a second message in accordance with the response and with metadata; sending the second message to the central connectivity component via the secure link; routing the second message to a hosted connectivity agent associated with the hosting center using the metadata; and sending the communication to the application, wherein only communication related to the organization is exchanged between the central connectivity component and the on-premise connectivity agent.

Yet another aspect of the disclosure relates to a computer program product, comprising a computer usable medium having a computer readable program code embodied therein, said computer readable program code adapted to be executed to implement a method for providing, an on-demand service to an organization by a hosting center, said method comprising: receiving a message sent from a computing platform of the organization to an on-premise connectivity agent; creating a communication in accordance with the message, the communication comprising metadata related to the organization; sending the communication to a central connectivity component via a secure link; routing the communication to a hosted connectivity agent associated with the hosting center using the metadata; and sending the communication to an application associated with the hosting center, wherein only communication related to the organization is exchanged between the central connectivity component and the on-premise connectivity agent.

DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 2A is a flowchart of the main steps in a method for enabling a customer organization to use on-demand remote services by a provider employing a hosting center, in accordance with the disclosure; and FIG. 2B is a flowchart of the main steps in a method for using an on-demand service provided by a hosting Center to a customer organization, in accordance with the disclosure.

DETAILED DESCRIPTION

Figure 1:
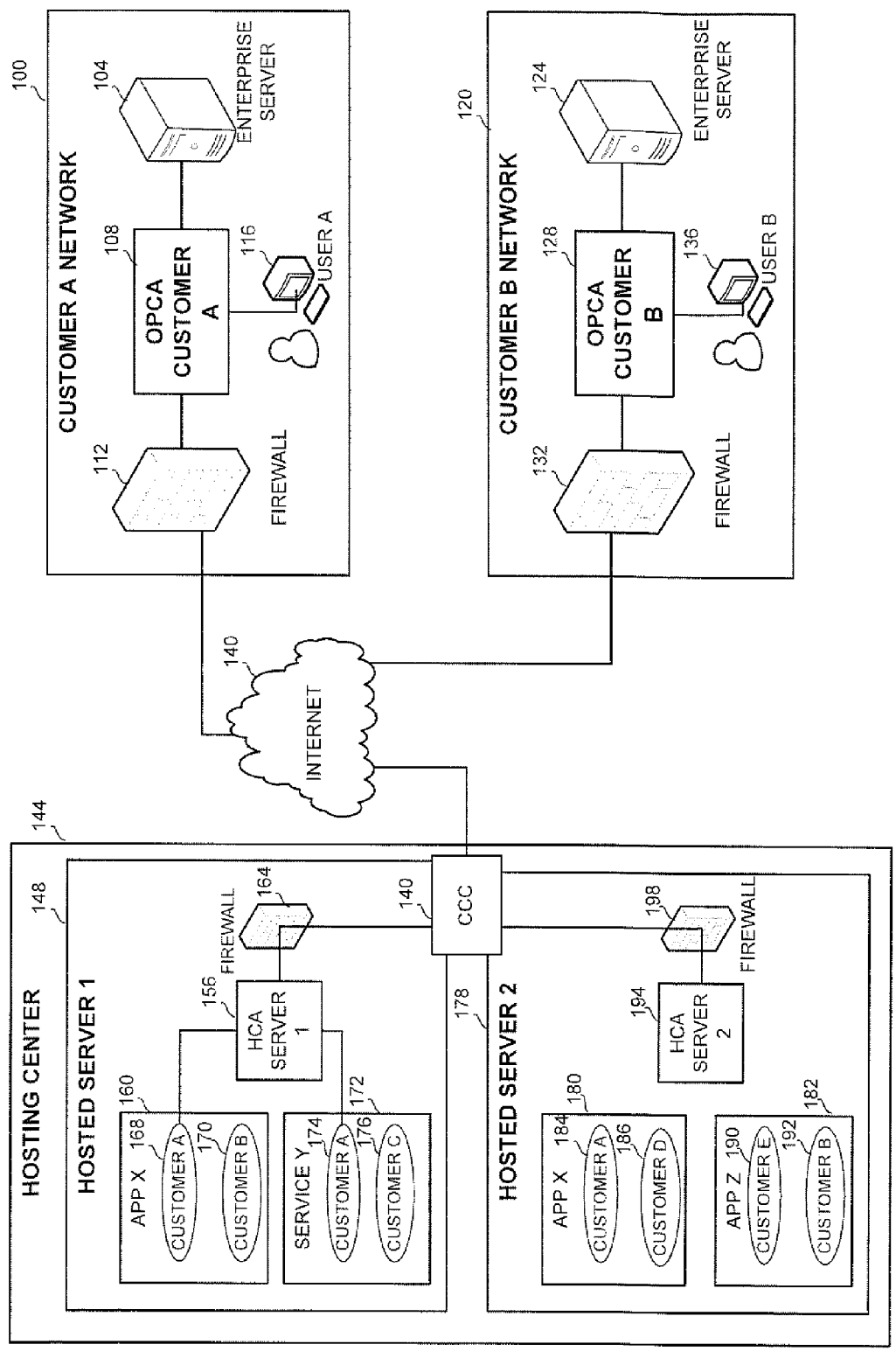
FIG. 1 is a block diagram of the main components in a typical environment in which an organization consumes on-demand services, in accordance with the disclosure.

This application relates to and herein incorporates by reference: U.S. patent application titled "Apparatus and Method for Remote Processing While Securing Classified Data" filed Dec. 31, 2009, invented by the same inventors as this application; and U.S. patent application Ser. No. 12/166,326 titled "Method and Apparatus for Distributed Application Context-Aware Transaction Processing" filed Jul. 2, 2008.

The disclosed method and apparatus enable one or more organizations to consume on-demand services hosted by multi-tenant servers (hosting servers), which may be provided by a third party. Consuming a service may relate also to executing an application, sending or receiving data or services from an application, or otherwise communicating with an application. The hosting servers may be located in a physically remote site from the client organizations. The customer organization delegates authority to an external party to perform some of its tasks or provide various services on behalf of the customer organization. This is different from collaboration, since the remote server only provides service which is required for the customer organization.

The method and apparatus comprise an on-premise connectivity agent (OPCA) located on the organization's network and behind its firewall, and serving as an on-premise "listening" point, i.e., an access and communication point between the hosted service and the organization's systems and users. All communication between the organization's systems and the hosting servers providing the on-demand services are provided through the on-premise connectivity agent. The OPCA may also be referred to as Front End Agent (FEA).

The hosting server side comprises a server hosting connectivity agent (HCA). The HCA may be per-hosting-server but may also be configured to provide hosting connectivity to multiple customer organizations. The HCA can be operated by a server belonging to the hosting center, a server residing at the hosting center premises, or any other computing platform associated with the hosting center.

The apparatus may also comprise a central connectivity component (CCC) which is not associated with a particular customer. The CCC routes communication between one or more customer organizations and one or more servers and software services.

Thus, communication flows between the on-premise connectivity agent on the customer side and the hosting connectivity agent on the on-demand server side, possibly through the central connectivity component.

Communication between the OPCA and the CCC relates only to the customer whose OPCA it is, and may be secured, for example by certificate exchange. Further, the communication relates only to an account that is shared by all users of the enterprise for a particular application or service. Thus, all users of the enterprise who use a particular application or service supplied by the hosting center share a common account for this purpose. The communication between the OPCA and the CCC may therefore comprise indications, such as tags, for the organization as well as for the relevant context, such as application identification, user identification, context, or other parameters.

The communication between the OPCA and the CCC may be transferred using HTTP or any other standard protocol which is by default open through the firewall.

The CCC routes the communication to the relevant remote server in accordance with the message indications, such as the tags.

Therefore, since communication between the CCC and the HCA relates to multiple customer organizations, the CCC may multiplex information related to multiple customer organizations. The CCC may also function as a security means by isolating between the on demand network or zone, the organization network, and in collaboration with the OPCA, the network of each on-premise customer.

Referring now to FIG. 1 showing a block diagram of an exemplary embodiment of an environment in which an organization receives services from a source external to the organization.

The environment comprises two exemplary customer organizations networks, such as customer A network 100 and customer B network 120. The environment further comprises hosting center 144 which comprises one or more hosted servers such as hosted sever 1 (148) and hosted server 2 (178), each of which may be implemented as one or more physical servers, virtual machines, or any other implementation.

Customer A network 100 comprises an on-premises connectivity agent (OPCA) 108 for customer A, which serves as a listening point, a communication point or an entry point for access between the organization and hosting center 144. OPCA 108 thus delivers the on-demand service to the organization.

Communication between hosting center 144 and organization network 100 or 120 is optionally bi-directional. In operations initiated by one of the organizations, one or more users within the organization may use computing platforms such as computing platform 116 to access OPCA 108 in order to consume services supplied by hosting server 144 through OPCA 108. For example a user may access a billing application executed on a hosted server through OPCA 108 and CCC 140_in order to report his or her hours.

Customer A network 100 may further comprise enterprise server 104 for performing operations related to the enterprise, and firewall 112 for protecting the organizational computerized systems. A server at hosting center 144 may access enterprise server 104 in order to obtain information or execute operations. Such access is also enabled through OPCA 108 which is the listening point between the two systems.

For example, a billing application, named application X, provided by hosted server 1 (148) may require an employee's hourly rate available from enterprise server 104 in order to issue a bill for services provided by an employee of enterprise A. In such case, application X provided by hosted server 1 (148) accesses enterprise server 104 through OPCA 108 in order to retrieve the required information.

In a corresponding manner. Customer B enterprise 120 comprises enterprise server 124 used for performing operations related to the enterprise, firewall 132 for protecting the organizational computerized systems, and OPCA 128 serving as a communication point and an entry point for access to the organization from hosting center 144. One or more users use computing platform 136 to access OPCA 128.

Hosting center 144 comprises one or more hosted servers, hosted server 1 (148) comprises Hosting Connectivity Agent (HCA) 156 for server 1, which accesses the various supported applications or services, such as application X (160) or service Y (172).

Each such application may comprises data, executable, storage or other resources to be used by a particular customer organization, such as exemplary area 168 used by customer A when using application X, area 170 used by customer B when using application X, area 174 used by customer A when using application Y, area 176 used by customer C when using application Y, or the like.

Hosted server 1 (148) may also comprise firewall 164 for protecting the server from unauthorized accesses.

Similarly, in an exemplary and corresponding manner, virtual server 2 (178) comprises application X (180), area 184 for customer A and area 186 for customer D, application Z (182), area 190 for customer E and area 192 for customer 13, HCA 194 for server 2, and firewall 198.

Hosting center 144 optionally comprises Central Connectivity Center (CCC) 140, for routing communication between OPCA 108 or OPCA 128, and HCA 156 or HCA 194. In an alternative embodiment. CCC 140 can be external to hosting center 144 and to any customer organization.

CCC 140 separates the two environments, being customer A network 100 and hosting center 144.

It will be appreciated that communication between the customer networks 100 and 120, and hosting center 144 flows through any communication channel, and in particular may flow through the internet (140).

Optional CCC 140 serves as a routing component for enabling bi-directional communication between the on-premise systems such as enterprise server 104 or enterprise server 124, and the on-demand software, provided by virtual server 1 (148) or virtual server 2 (178). CCC 140 thus enables enterprise servers to consume services from the hosting center, and if a particular service offered by the hosting center has to access an enterprise server this is also done through CCC 140. CCC 140 can also encrypt, compress, or optimize the communication between the OPCA the RCA. In order to provide services to multiple organizations, CCC 140 optionally routes the communication within hosting center 144 in accordance with the proprietary tagging of messages, and without exposing customer-related details, such as application data, user data or the like. Tagging the messages can be done by OPCA 108 or OPCA 128 for communications initiated by the organization. In the other direction, when the operation is initiated by hosting center 144, tagging can be done by the customer-specific applications such as application X for customer A (168), or by the relevant HCA, such as HCA 156.

CCC 140 can be comprised of one or more instances for providing communication between the OPCAs residing on the organizations' premises and the HCAs residing on the hosting center. In case multiple instances are used, each instance can be responsible for communication between one or more virtual servers, and one or more customers' enterprise resources. Also, if multiple instances are used, another level of routing may be required for distributing the activity between the multiple CCC instances.

CCC 140 can reside within the hosting center, or in an independent location external to the hosting center and to the customers.

CCC 140 may connect to the OPCA in a secure manner wherein only the relevant customer's data is exchanged, and using for example certificate exchange.

CCC 140 may connect to the HCA in a secure manner, using one certificate exchange, while multiplexing information related to multiple customers and relating to multiple applications.

OPCA 108 or OPCA 128 serve as agents of hosting center 144 within customer A network 100 or customer B network 120, respectively. Each OPCA is installed within the customer's local area network (LAN) and behind its firewall. OPCA 108 or OPCA 128 may connect to CCC 140 via web proxy, so that no changes to the customer's firewall configuration or firewall rule definition are required.

Since no changes to the organization's systems or firewall are required, OPCA 108 or OPCA 128 may be installed and configured without incurring significant costs.

In some embodiments, the customer may have to configure a "hosted application account" which is used by all users requiring services from the hosted application. The account is granted permissions to the relevant on-premise systems. From within the organization, the OPCA is regarded as a trusted server that provides the required functionality. Behind the scenes, the OPCA delegates the work to an external resource. Since a single account is used in the communication between the OPCA and the CCC, the OPCA may have to keep the accessing user's credentials and relate the relevant response, data or operations to the relevant user.

HCA 156 or HCA 194 have a secure connection to CCC 140, using for example certificate exchange. The exchanged certificate may be, for example, a Public Key Infrastructure (PKI) certificate, which allows a person or an organization to combine a digital signature with a public key and a non-public identifying detail, such as a real life name.

The HCA may be configured once per installation of a new server, or per customer or application by the hosting center administrator. The configuration may also be performed automatically.

It is assumed that hosting center 144 is responsible for security within the center boundaries, by preventing a particular customer from accessing data of another customer.

It will be appreciated that the customers' enterprises may comprise one or more computing platforms, on which one or more applications are performed. For example, server 104 or server 124, as well as virtual server 1 (148) or virtual server 2 (178) can be implemented as a computing platform such as a general purpose computer, a personal computer, a mainframe computer, a server, a mobile device, or any other type of computing platform provisioned with a memory device, a CPU or microprocessor device, and I/O ports.

OPCA 108 or OPCA 128, CCC 140, HCA 156 or HCA 194, or any of the firewalls may be implemented as one or more sets of computer instructions, arranged as executables, libraries, functions, web pages, portals or other units designed to be executed by a computing platform Alternatively, the OPCAs, CCC or HCAs can be implemented as firmware ported for a specific processor such as digital signal processor (DSP) or microcontrollers, or can be implemented as hardware or configurable hardware such as field programmable gate array (FPGA) or application specific integrated circuit (ASIC).

Communication between the customer enterprises and the hosting center can take any required protocol, such as HTTP with or without higher layers such as SOAP, REST, XML RPC or any other method which embeds application level context into the communication.

Referring now to FIG. 2A, showing a flowchart of the main steps in a method for enabling a customer organization to use on-demand remote services by a provider employing a hosting center.

At step 200, an on-premises connectivity agent (OPCA) is installed at the premises of the organization. The agent is within the organization's local area network and is protected together with the organizational resources, for example by a firewall.

The OPCA is responsible for transferring communications between computing platforms of the organization and the provider.

At step 204, a hosting center connectivity agent is provided at the hosting center provider premises, which provides communication to or from a virtual server of the provider.

At step 208, if the hosting center has more than one virtual server, or if there are multiple customers using the hosting center services, then a central connectivity component (CCC) may be provided, which routes communication between one or more customer organization and one or more virtual servers, such that a communication from customer A requiring a service or from application X is routed to a virtual server providing service X and associated with customer A.

At step 212 a secure connection is provided between the OPCA at the organization premises, and the HCA. The connection is secured, for example by using a certificate exchange. If the service provider has more than one server, and a CCC is provided, then the secure connection is between the OPCA and the CCC.

Referring now to FIG. 2B, showing a flowchart of the main steps in a method for using an on-demand service from a hosting center by a customer organization. The method is used once the components have been provided as detailed in associate with FIG. 2A above.

At step 224, a computing platform used by a user and executing a client side of an application accesses the OPCA associated with the user's organization with a request. In some embodiments, the OPCA is viewed by the user and by the computing platforms within the organization as an on-premises service provider, such that the user and the computing platform may be unaware that the service is provided by an external entity. The request may contain the user's identification, role, relevant application or other details.

At step 228 the OPCA either updates the communication received from the computing platform of the user, or creates a new communication message based on it. The organization may use a single account shared by all users when communicating with the provider. The OPCA tags the message with identification tags, which associate the message with the organization identification or shared account, and further data and metadata, such as application identification, user's role, context or any other detail. Tagging the messages enables the routing of the message within the hosting center as further explained below.

At step 232 the communication is channeled to the CCC using a secured channel between the CCC and OPCA. The secure channel may be persistent or may be reestablished anew for each communication.

At step 234 the communication is routed by the CCC, within the multi-tenant environment of the hosting center to an HCA executed by a server which provides the server side for the relevant application, and is associated with the organization. The routing is performed in accordance with the tagging embedded within the communication message, so that the message is routed to the relevant customer's application handler within the multi-tenant environment of the hosting center, using the correct context if required, or the like.

At step 236 the communication is routed from the HCA to the relevant application, and is handled by the relevant application.

If a response or further activity is required, or further information is required from the organization in order for the application to complete the task, then at step 240 the application may send a new communication via the HCA to the CCC. The communication may be a response to the user's initial request, a request for information required for completing the application's task, or the like. Alternatively, step 240 can be performed as part of an operation initiated by the application, and not only upon processing a request from a user or an application within the organization network.

The communication sent to the CCC may comprise tagged data for routing from the CCC to the relevant organization network, and for supplying information that may be required for handling the communication.

At step 244 the CCC routes the communication to the OPCA of the relevant customer organization, using the tagging or other information.

At step 248 the OPCA receives the communication. The OPCA sends a query or a request to a relevant server or computing platform within the organization network. Upon receipt of a response from the computing platform, the OPCA may send a response to the hosting center in the same manner as the initial request.

If required, the process repeats for further requests by the user or the server, or for the hosting center addressing the organization further.

It will be appreciated that the detailed method covers also an apparatus for carrying out the method in which every step is performed by a relevant component, and also a computer storage device comprising computer instructions for carrying out the method.

It will be appreciated that the disclosed subject matter can also be associated with a storage device comprising computer instructions for performing the disclosed methods.

It will be appreciated that the disclosed apparatus, method and device are exemplary only and that further embodiments can be designed according to the same guidelines and concepts. Thus, different, additional or fewer components or steps can be used, different features can be used, different configurations can be applied, or the like.

It will be appreciated by persons skilled in the art that the present disclosure is not limited to what has been particularly shown and described hereinabove. Rather the scope of the present disclosure is defined only by the claims which follow.

The invention claimed is:

1. An apparatus for providing on-demand application execution service to an organization by a hosting center, the apparatus comprising:
   a hosted connectivity agent component executed by a server associated with the hosting center, for providing the on-demand application execution service associated with an at least one user of the organization for exclusive use by the at least one user having an account of the organization with the hosting center;
   an on-premise connectivity agent located within a network associated with the organization for communicating with a server computing platform, the server computing platform associated with the organization and configured for delivering the on-demand application execution service to the organization, the on-premise connectivity agent providing metadata to communications sent from the organization to the hosted connectivity agent component; and
   a central connectivity component for routing a communication between the hosted connectivity agent component and the on-premise connectivity agent, wherein only communication that relates to the organization is exchanged between the central connectivity component and the on-premise connectivity agent, and such that communication between the central connectivity component and the on-premise connectivity agent is secure at least by a certificate exchange.

2. The apparatus of claim 1 wherein the at least one user is a plurality of users and the account of the organization with the hosting center is shared with multiple users within the organization, and wherein the metadata comprises indication to the account.

3. The apparatus of claim 1 wherein the on-premise connectivity agent is protected by a firewall of the organization.

4. The apparatus of claim 1 wherein the hosted connectivity agent is protected by a firewall of the hosting center.

5. A method for providing an on-demand application execution service to an organization by a hosting center, the method comprising:
   receiving a message sent from a computing platform of the organization to an on-premise connectivity agent by an at least one user;
   creating a communication in accordance with the message, the communication comprising metadata related to the organization;
   sending the communication to a central connectivity component via a link secured by at least a certificate exchange;
   routing the communication to a hosted connectivity agent associated with the hosting center using the metadata; and
   sending the communication to an application execution service associated with the hosting center and associated with the at least one user of the organization for exclusive use by the at least one user having an account of the organization with the hosting center, wherein only communication related to the organization is exchanged between the central connectivity component and the on-premise connectivity agent.

6. The method of claim 5 further comprising:
   sending a second communication from the hosted connectivity agent to the central connectivity component;
   routing the second communication from the central connectivity component to the on-premise connectivity agent; and
   sending information from the communication to the computing platform.

7. The method of claim 5 wherein the central connectivity component isolates between a network associated with the organization and the hosting center.

8. The method of claim 5 wherein communication between the on-premise connectivity agent and the central connectivity component uses Hypertext Transfer Protocol.

9. A method for providing an on-demand service to an organization having an organization network by a hosting center, the method comprising:
   sending a communication associated with an application, hosted within the hosting center, providing the on-demand service associated with an at least one user of the organization for exclusive use by the at least one user having an account of the organization with the hosting center from a hosted connectivity agent within the hosting center to a central connectivity component, the communication comprising information related to the organization;

routing the communication from the central connectivity component to an on-premise connectivity agent within the organization, using a secure link secured by at least a certificate exchange;

sending a message associated with the communication from the on-premise connectivity agent to a computing platform within the organization network;

receiving a response from the computing platform;

generating a second message in accordance with the response and with metadata;

sending the second message to the central connectivity component via the secure link;

routing the second message to a hosted connectivity agent associated with the hosting center using the metadata; and sending the communication to the application, wherein only communication related to the organization is exchanged between the central connectivity component and the on-premise connectivity agent.

10. A computer program product, comprising a non-transitory computer readable medium having a computer readable program code embodied therein, said computer readable program code configured to be executed to implement a method for providing an on-demand service to an organization by a hosting center, said method comprising:

receiving a message sent by an at least one user of the organization from a computing platform of the organization to an on-premise connectivity agent;

creating a communication in accordance with the message, the communication comprising metadata related to the organization;

sending the communication to a central connectivity component via a secure link secured by at least a certificate exchange;

routing the communication to a hosted connectivity agent associated with the hosting center using the metadata; and sending the communication to an application, hosted within the hosting center, associated with the hosting center and associated with an at least one user of the organization for exclusive use by the at least one user having an account of the organization with the hosting center, wherein only communication related to the organization is exchanged between the central connectivity component and the on-premise connectivity agent.

* * * * *